United States Patent
Wu et al.

(10) Patent No.: US 8,543,406 B2
(45) Date of Patent: Sep. 24, 2013

(54) METHOD AND SYSTEM FOR COMMUNICATING WITH AN INTERACTIVE VOICE RESPONSE (IVR) SYSTEM

(75) Inventors: Su-Lin Wu, San Carlos, CA (US); Kostas Tsioutsiouliklis, San Jose, CA (US); Arkady Borkovsky, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1023 days.

(21) Appl. No.: 12/357,645

(22) Filed: Jan. 22, 2009

(65) Prior Publication Data

US 2010/0185449 A1 Jul. 22, 2010

(51) Int. Cl.
*G10L 21/00* (2013.01)

(52) U.S. Cl.
USPC .......... 704/275; 370/260; 370/352; 379/16; 379/365.01; 379/265.02; 379/399.01; 379/88.14; 379/88.18; 379/88.22; 379/88.23; 455/422.1; 704/270.1; 705/26.5; 705/338; 714/746

(58) Field of Classification Search
USPC .............. 379/88.23, 399.01, 88.14, 88.22, 379/16, 265.01, 265.02, 88.18; 370/260, 370/352; 455/422.1; 704/270.1, 275; 705/26.5, 338; 714/746
See application file for complete search history.

(56) References Cited

U.S. PATENT DOCUMENTS

| | | | |
|---|---|---|---|
| 6,421,427 B1 * | 7/2002 | Hill et al. ................ | 379/88.14 |
| 6,446,042 B1 * | 9/2002 | Detlef et al. ............. | 704/275 |
| 6,904,143 B1 * | 6/2005 | Peterson et al. ......... | 379/265.01 |
| 7,003,463 B1 * | 2/2006 | Maes et al. .............. | 704/270.1 |
| 7,065,188 B1 * | 6/2006 | Mei et al. ................ | 379/88.23 |
| 7,076,032 B1 * | 7/2006 | Pirasteh et al. .......... | 379/88.18 |
| 7,133,504 B2 * | 11/2006 | Fostick .................... | 379/88.14 |
| 7,330,721 B2 * | 2/2008 | Bhatia et al. ............. | 455/422.1 |
| 7,353,187 B1 * | 4/2008 | Emodi et al. ............. | 705/26.5 |
| 2003/0179876 A1 * | 9/2003 | Fox et al. ................. | 379/265.02 |
| 2003/0198194 A1 * | 10/2003 | Franz et al. .............. | 370/260 |
| 2003/0208372 A1 * | 11/2003 | Estes ....................... | 705/1 |
| 2004/0120479 A1 * | 6/2004 | Creamer et al. .......... | 379/88.22 |
| 2004/0177305 A1 * | 9/2004 | Payne et al. .............. | 714/746 |
| 2005/0163288 A1 * | 7/2005 | Lobig ...................... | 379/16 |
| 2006/0133597 A1 * | 6/2006 | Song ........................ | 379/399.01 |
| 2007/0081520 A1 * | 4/2007 | Da Palma et al. ........ | 370/352 |

* cited by examiner

*Primary Examiner* — Michael Colucci
(74) *Attorney, Agent, or Firm* — James J. DeCarlo; Greenberg Traurig, LLP

(57) ABSTRACT

Disclosed is a method and system for interacting with an IVR system. In one aspect, a computing device receives a user request to connect to an IVR system to perform an action. A request for information (e.g., a request to select from a plurality of menu options) is obtained from the IVR system. In response to the request, the computing device automatically supplies an answer to the request for information to the IVR system. In one embodiment, the answer is a dual-tone multi-frequency (DTMF) signal. The obtaining and supplying steps are repeated until the action has been performed.

21 Claims, 5 Drawing Sheets

METHOD AND SYSTEM FOR COMMUNICATING WITH AN INTERACTIVE VOICE RESPONSE (IVR) SYSTEM

FIELD

The present disclosure relates to interactive voice response (IVR) systems, and more specifically to a user-side IVR system.

BACKGROUND

Interactive Voice Response (IVR) systems are commonly used by today's companies and organizations. IVR systems allow for the automatic handling of many user requests without the costlier involvement of human respondents.

From a user's perspective, interaction with different IVRs is often similar because of the standardization of menu choices and the repeated request for the same information. For example, many IVRs authenticate a user by asking for the user's personal identification number (PIN), mother's maiden name, and/or personal data (e.g., social security number or date of birth). The user may have to go through long-winded, multi-level menus before being able to perform the action that the user wants to perform. Further, the user may not have information requested by the IVR system readily available. The user may also have to repeat information (e.g., difficult to pronounce names or other information) one or more times, and may have to repeat the process numerous times if, for example, the user chooses an incorrect menu choice which leads the user to an undesired part of the IVR system decision tree. This inconvenience can be made worse when a user has a foreign accent and the IVR system cannot recognize or decipher the foreign accent.

Therefore, there remains a need to improve the interaction between a user and an IVR system.

SUMMARY

A method and system for interacting with an IVR system is disclosed. In one aspect, a computing device receives a user request to connect to an IVR system to perform an action. A request for information (e.g., a request to select from a plurality of menu options) is obtained from the IVR system. In response to the request, the computing device automatically supplies an answer to the request for information to the IVR system. In one embodiment, the answer is a dual-tone multi-frequency (DTMF) signal. The obtaining and supplying steps are repeated until the action has been performed.

In one embodiment, the computing device performs a training stage so that the computing device can correctly supply answers to the IVR system. In one embodiment, the training stage includes the computing device connecting to one IVR system in a plurality of IVR systems, where each IVR system comprises a decision tree. The computing device learns the decision tree for the one IVR system by traversing through every option in the decision tree, and repeats the connecting and learning steps for each IVR system in the plurality of IVR systems.

In one embodiment, the computing device transmits the request for information to a user via an output device (e.g., a speaker or a telephone) and enables the user to supply an answer to the request for information using the computing device. The computing device can also provide (e.g., display) an indication to the user that the activity has been performed.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
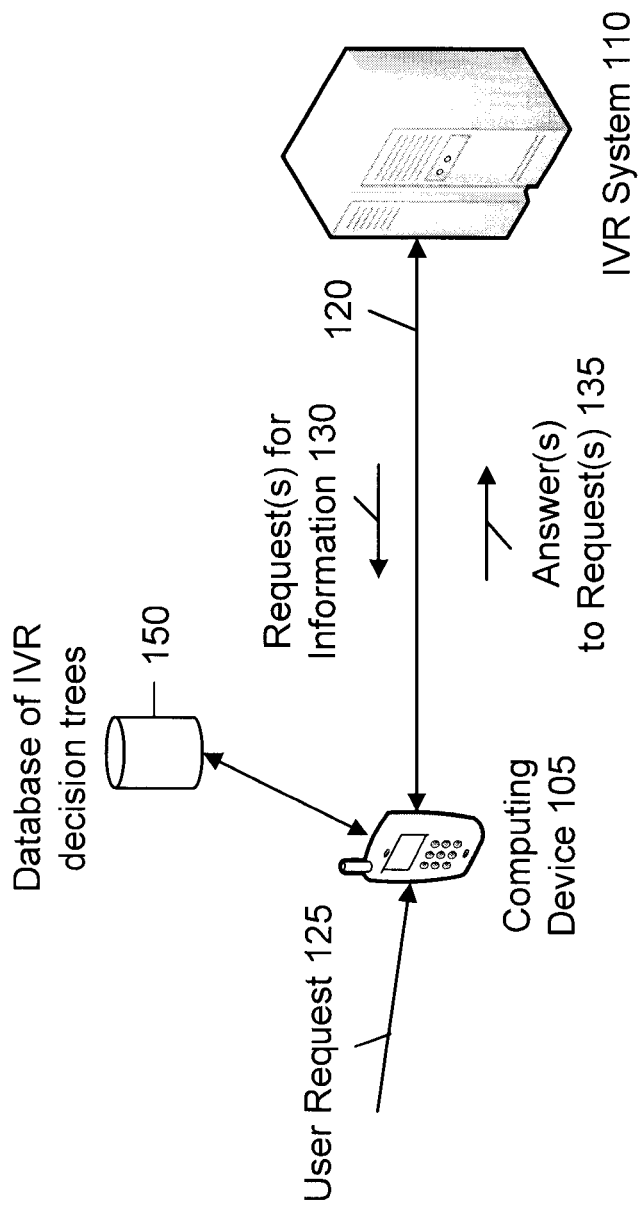
FIG. 1 is a block diagram of a computing device in communication with an IVR system in accordance with an embodiment of the present invention.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the invention that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

In one embodiment, and referring to FIG. 1, a computing device 105 is in communication with an IVR system 110 over a communication channel 120, such as a wire or a wireless channel. For purposes of this disclosure, a computer or computing device such as the computing device 105 includes a processor and memory for storing and executing program code, data and software which may be stored or read from computer readable media. Computers can be provided with operating systems that allow the execution of software applications in order to manipulate data. Computing device 105 can be any device that can communicate with the IVR system 110 and that can be used by a user. Personal computers, personal digital assistants (PDAs), wireless devices, smart phones, cellular telephones, internet appliances, media players, home theater systems, and media centers are several non-limiting examples of computing devices.

As described above, the communication channel 120 can be a wire or a wireless communication channel between the computing device 105 and the IVR system 110. In one embodiment, the communication channel 120 is a channel transmitting information over a network, such as the Internet.

IVR systems such as IVR system 110 are systems that detect voice and keypad inputs. An IVR system can respond with pre-recorded or dynamically generated audio to direct users on how to proceed. IVR systems can be used to control functions where the interface can be broken down into a series of menu choices. Specifically, each IVR system includes one or more decision trees specifying a plurality of choices that can be taken when communicating with the IVR system. Examples of typical IVR applications include, but are not limited to, telephone banking, telephone voting, prescription refills, and credit card transactions. Companies typically use IVR services to extend the business hours of operation.

For the purposes of this disclosure, a computer readable medium is a medium that stores computer data in machine readable form. By way of example, and not limitation, a computer readable medium can comprise computer storage media for tangibly storing data, as well as communication media, methods or signals. Computer storage media for tangible storage includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer or processor.

In one embodiment, a user provides (e.g., types in) a user request 125 to computing device 105 to connect to IVR system 110 to perform an action. For example, the user request 125 may be to connect to the IVR system 110 to pay a bill or to refill a prescription. In one embodiment, the user request 125 specifies the telephone number of the IVR system 110 to which to connect in order to perform the action. The computing device 105 connects to the IVR system 110 (e.g., a web site displayed on the computing device 105 creates a Voice over Internet Protocol (VOIP) telephone link to the IVR system). The IVR system 110 transmits a request for information 130 to the computing device 105. The request for information 130 may include one or more menu options.

In one embodiment and in response to receiving the request for information 130, the computing device 105 automatically provides an answer 140 to the request. The answer 140 can be one or more dual-tone multi-frequency (DTMF) signals. In one embodiment, the computing device 105 determines the answer 140 to the request for information 130 from one or more decision trees stored in a database 150. The computing device 105 can also use speech recognition to determine an appropriate answer to the request for information 130. In one embodiment, the computing device 105 requests answers from the user to questions that the computing device 105 has determined will be asked by the IVR system 110. For example, upon the receipt of a user request 125, the computing device 105 can ask the user to enter information associated with the user, such as the user's full name, birth date, social security number, home address, and/or personal identification number. Alternatively, the computing device 105 has already dealt with the user and, upon receiving a user request 125 from a particular user, the computing device 105 retrieves from its memory (e.g., cache) stored information about the particular user. The computing device 105 can then use this user information during its communication with the IVR system 110. The stored user information can be transmitted by the computing device 105 to the IVR system 110 via, for example, DTMF or speech synthesis, or by playing out stored audio from the user.

In one embodiment, computing device 105 receives multiple user requests and communicates with a plurality of IVR systems in parallel to complete the actions specified in the user requests.

In one embodiment, the computing device 105 creates an instant messaging (IM) window and communicates with the IVR system via the IM window. Specifically, the requests for information 130 are displayed in the IM window and the computing device 105 answers the requests 130 with answer 140 entered into the IM window. In another embodiment, the computing device 105 transmits DTMF signals to the IVR system 110 using a voice card or via a cellular telephone line.

In one embodiment, decision trees can be purchased and downloaded to the computing device 105. For example, a user may be able to use the computing device 105 to navigate to a particular web site that sells decision trees for a variety of companies. The user may then purchase one or more of the available decision trees and download the decision tree(s) onto the computing device 105. Once the decision tree for a particular company has been downloaded to the computing device 105, the computing device 105 can then (correctly) interact with the company's IVR system 110.

Figure 2:
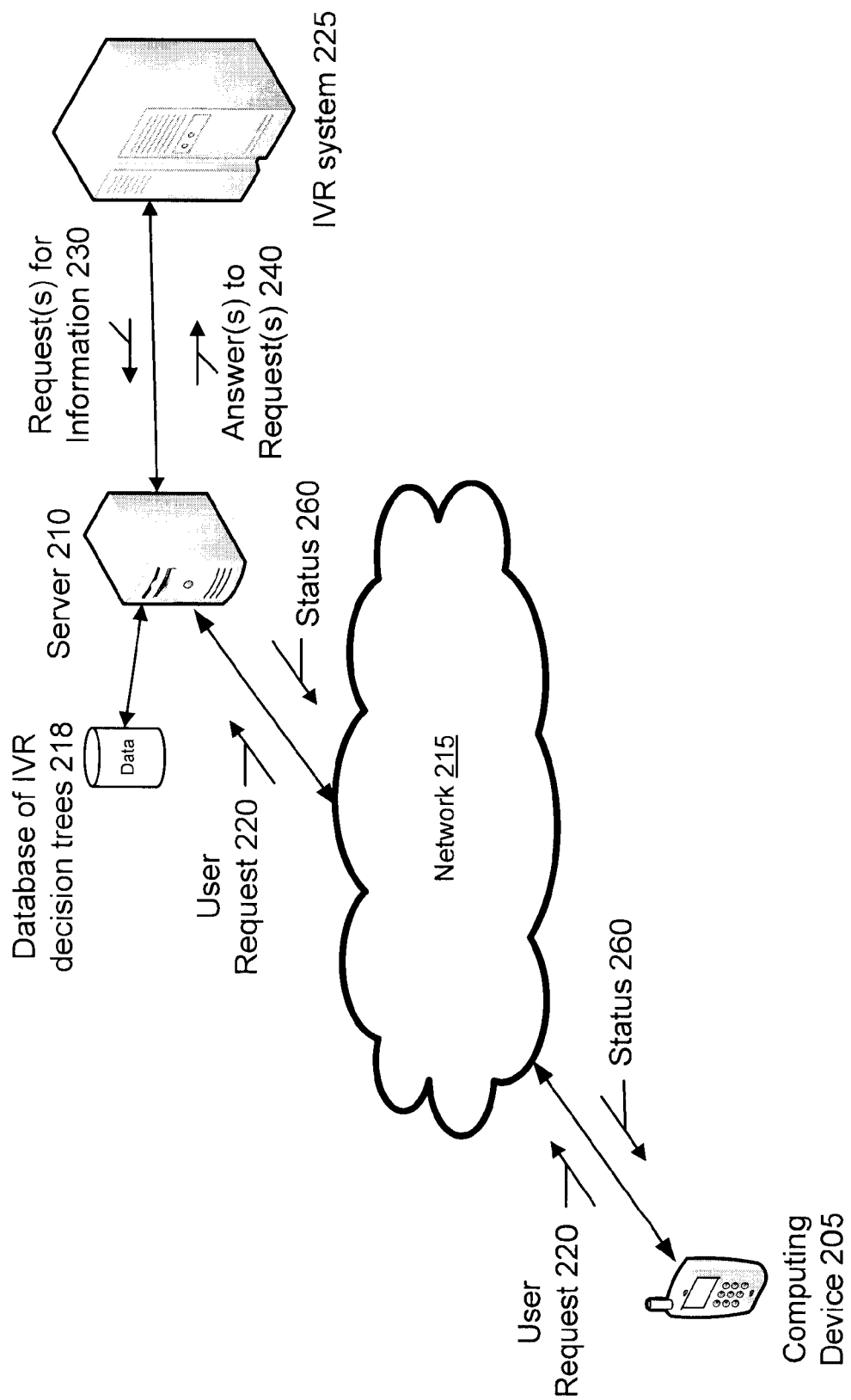
FIG. 2 is a block diagram of a computing device in communication with a server communicating with an IVR system in accordance with an embodiment of the present invention.
Figure 3:
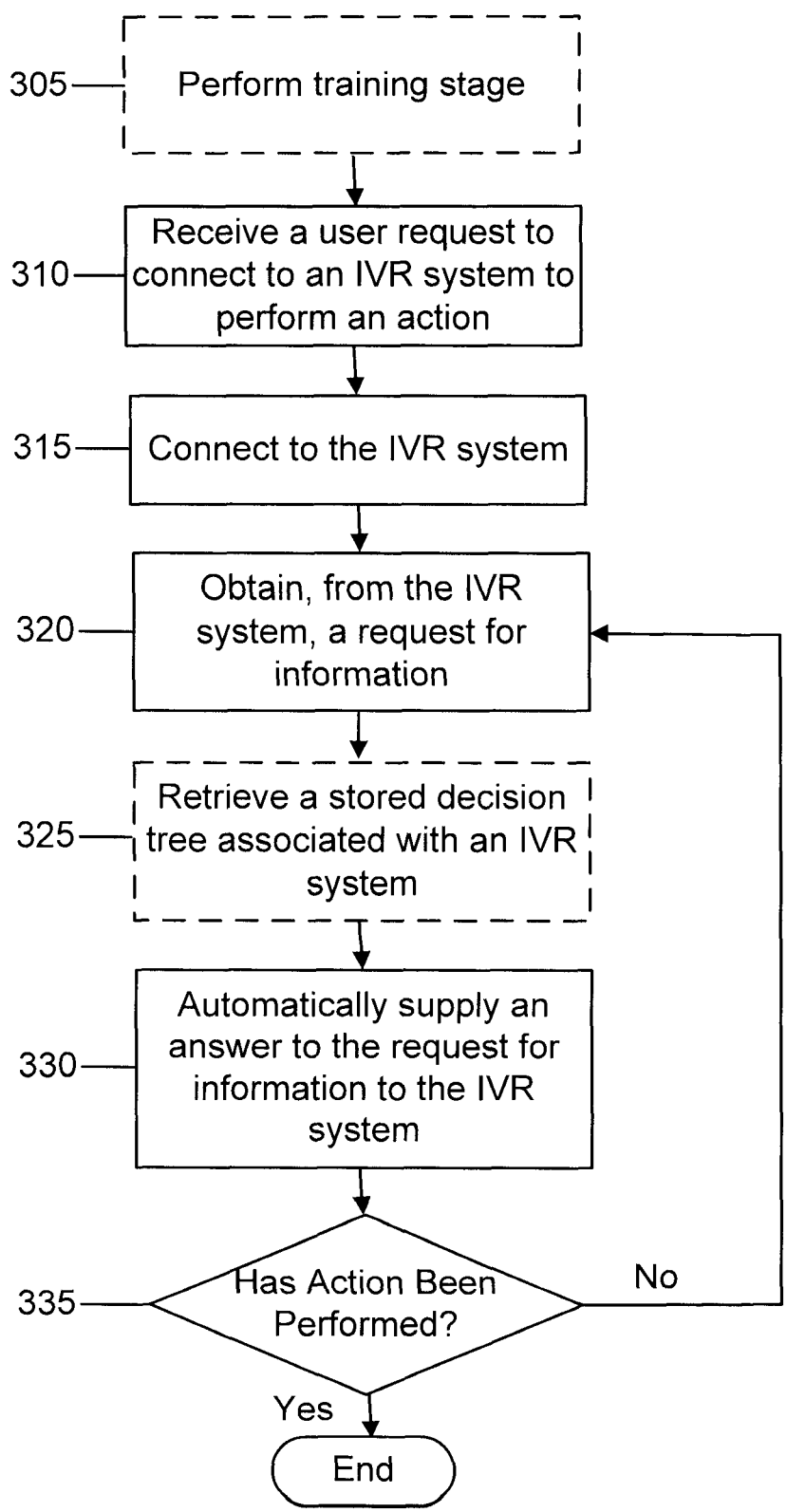
FIG. 3 is a flowchart illustrating steps performed by the server of FIG. 2 in accordance with an embodiment of the present invention.

FIG. 2 shows a block diagram of an embodiment of a computing device 205 in communication with a server 210 over a network 215, such as the Internet. FIG. 3 is a flowchart of an embodiment of steps performed by server 210 (or computing device 105). As described in more detail below, in one embodiment (and as shown with dashed lines), the server 210 (or computing device 105) performs a training stage in step 305. The training stage is performed by the server 210 (or computing device 105) in order to facilitate the correct interaction with IVR systems. The training stage may be a simple training or a complex training. In one embodiment, the training stage involves a user pushing buttons on the computing device 105 and the computing device 105 then repeating the pushed buttons the next time the computing device 105 receives a request for information 130 from the IVR system 110 or the computing device 205 transmitting the sequence of pushed buttons to the server 210. In another embodiment, no training stage is performed.

The server 210 is then ready to receive user requests. In one embodiment, a user uses the computing device 205 to access a web page on which the user can submit a user request 220. In one embodiment, the user request 220 identifies (e.g., via a telephone number) an IVR system that the user wants to connect to in order to perform one or more actions, such as to pay a bill. The computing device 205 transmits the user request 220 over the network 215 to server 210. The server 210 receives, in step 310, the user request 220 and determines (from the user request 220) to connect to IVR system 225 (step 315). In response to connecting with the server 210, the IVR system 225 requests one or more pieces of information 230 from the server 210 (step 320). In one embodiment, the server 210 retrieves a stored decision tree associated with the IVR system 225 in step 325 (shown with dashed lines) for use in performing step 330. In another embodiment, the server 210 performs speech recognition to determine how to respond to the request 230 for information. In response to each request 230, the server 210 automatically transmits an answer 240 to the request 230 (step 330). This answer 240 may be based on the decision tree retrieved from database 218, from speech recognition, and/or from stored user information associated with the user that has sent the user request 220. The server 210 continues receiving requests 230 for information from the IVR system 225 and providing answers 240 to the IVR system 225 until the action specified in the user request 220 has been performed (steps 320 through 335).

In one embodiment, if the server 210 cannot determine (e.g., based on its training) the correct answer to a request 230 for information, the server 210 transmits the request 230 for information to the computing device 205 for analysis by the user. The user can use the computing device 205 to indicate how to respond to the request 230 for information. The computing device 205 can transmit this instruction to the server 210, and the server 210 can then use this instruction to respond with an answer 240.

In one embodiment, when the server 210 completes the action or progresses in the IVR system's menu options as far as the server 210 can go, the server 210 transmits a status message 260 back to the computing device 205. The status message 260 can indicate to the user how far the server 210 went in completing the specified action. The status message 260 can be, for example, an email, a web page, or part of another web page.

Similar to computing device 105, the server 210 can receive multiple user requests from one or more computing devices. In one embodiment, the server 210 communicates with a plurality of IVR systems in parallel to complete the actions specified in the user requests.

Figure 4:
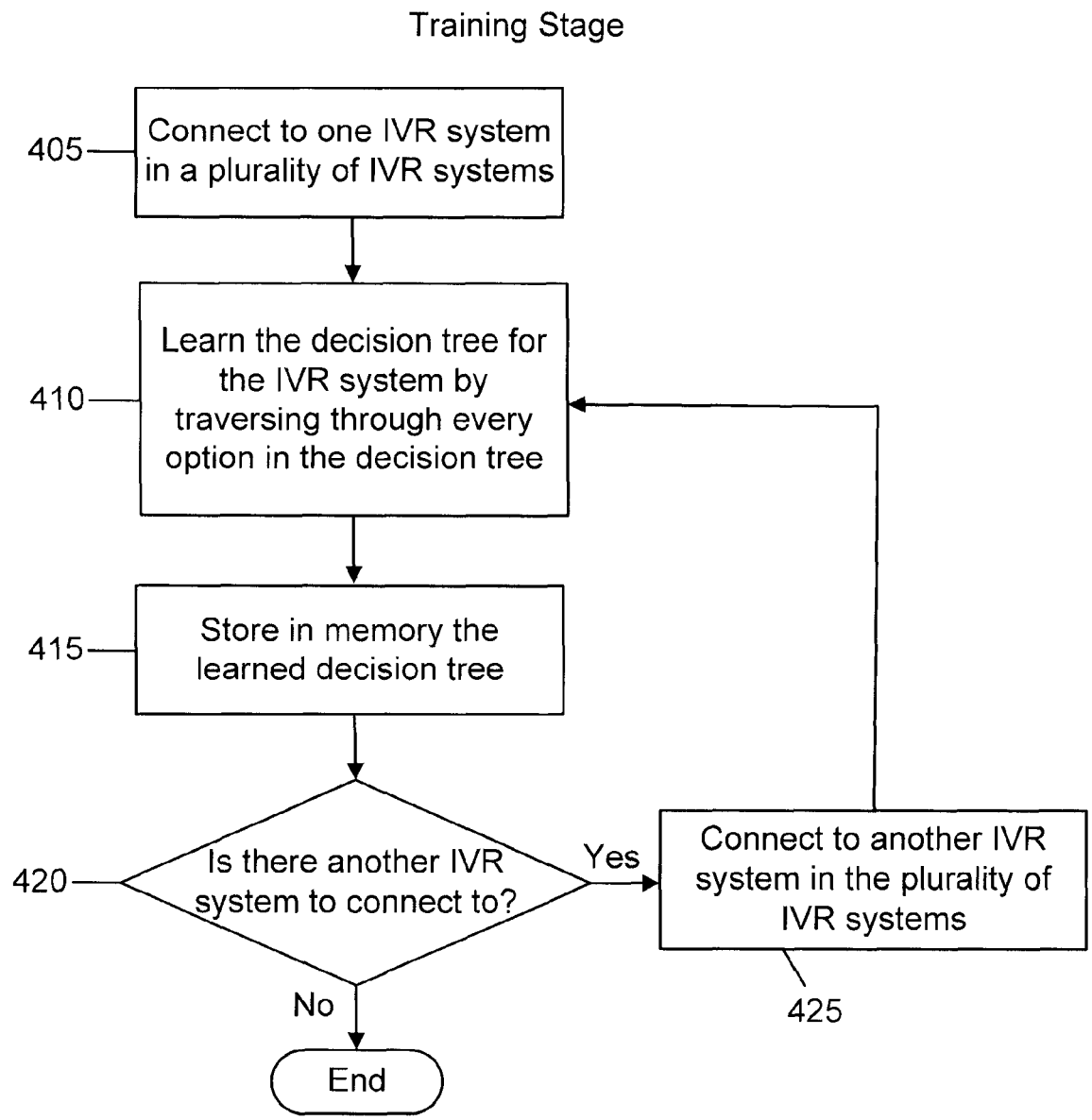
FIG. 4 is a flowchart illustrating steps performed by the server of FIG. 2 during a training stage in accordance with an embodiment of the present invention.

FIG. 4 illustrates a flowchart describing the training stage performed by the server 210. In step 405, the server 210 connects to an IVR system in a plurality of IVR systems. The server 210 then learns the decision tree for the IVR system by traversing through every option in the decision tree (step 410). The server 210 can store, in step 415, the learned decision tree in memory, such as in database 218. The server 210 then determines whether there is another IVR system to connect to in step 420. In one embodiment, the server 210 maintains a list of IVR systems to which the server 210 can connect. This list can be updated by, for example, the user of the computing device 205. If there is another IVR system to connect to, the server 210 connects to the IVR system (step 425) and repeats steps 410 through 420. If not, then the training stage has completed and the server 210 is ready to process user requests.

Figure 5:
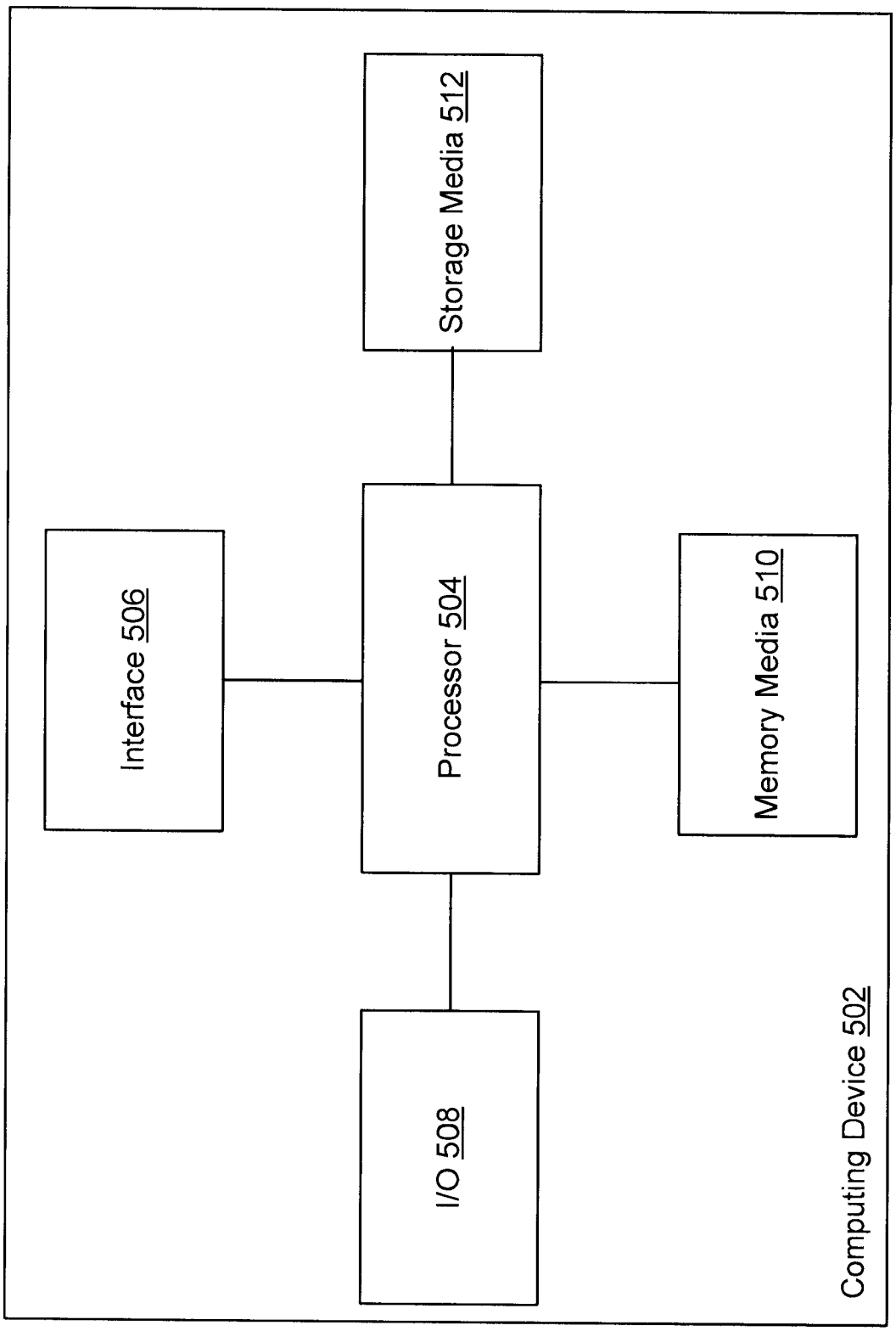
FIG. 5 is a high level block diagram of a computing device in accordance with an embodiment of the present invention.

The description herewith describes the present invention in terms of the processing steps required to implement an embodiment of the invention. These steps can be performed by an appropriately programmed computing device or computer, the configuration of which is well known in the art. An appropriate computing device can be implemented, for example, using well known computer processors, memory units, storage devices, computer software, and other components. A high level block diagram of such a computing device is shown in FIG. 5. Computing device 502 is an example of computing devices 105, 205 and contains a processor 504 which controls the overall operation of computing device 502 by executing computer program instructions which define such operation. The computer program instructions can be tangibly stored in a storage media 512 (e.g., magnetic or optical disk or other computer readable medium now known or to become known) and loaded into memory media 510 or read directly from media 510 when execution of the computer program instructions is desired. Computing device 502 also includes one or more interfaces 506 for communicating with other devices (e.g., locally or via a network). Computing device 502 also includes input/output 508 which represents devices which allow for user interaction with the computing device 502 (e.g., display, keyboard, mouse, speakers, buttons, etc.).

One skilled in the art will recognize that an implementation of an actual computing device will contain other components as well, and that FIG. 5 is a high level representation of some of the components of such a computing device for illustrative purposes, which may be, for example, a personal computer, PDA, wireless device, internet appliance, cellular telephone, or such processor driven technology. In addition, the processing steps described herein can also be implemented using dedicated hardware, the circuitry of which is configured specifically for implementing such processing steps. Alternatively, the processing steps can be implemented using various combinations of hardware, firmware and software.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the first or second computers or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   receiving, by a computing device, a user request to connect to an Interactive Voice Response (IVR) system to perform an action, the computing device independent of and communicating with the IVR system;
   connecting to the IVR system;
   obtaining, by the computing device from the IVR system, a request for information;
   automatically supplying, by the computing device, an answer to the request for information to the IVR system in response to the request for information; and
   repeating, by the computing device, the obtaining and supplying steps until the action has been performed.

2. The method of claim 1 further comprising storing, in a memory accessible by the computing device, decision trees of IVR systems.

3. The method of claim 2 wherein the automatically supplying an answer to the request for information further comprises retrieving a decision tree from the stored decision trees.

4. The method of claim 3 wherein the automatically supplying an answer to the request for information further comprises using the decision tree to determine the answer to the request.

5. The method of claim 1 further comprising training the computing device so that the computing device correctly performs the automatically supplying step.

6. The method of claim 5 wherein the training the computing device comprises:
- connecting to one IVR system in a plurality of IVR systems, each IVR system in the plurality comprising a decision tree;
- learning the decision tree for the one IVR system by traversing through every option in the decision tree; and
- repeating the connecting and learning steps for each IVR system in the plurality of IVR systems.

7. The method of claim 6 further comprising storing, in a memory accessible by the computing device, each learned decision tree.

8. The method of claim 1 wherein the obtaining a request for information comprises receiving a plurality of menu options.

9. The method of claim 8 wherein the automatically supplying an answer to the request for information further comprises automatically selecting one of the plurality of menu options.

10. The method of claim 1 wherein the automatically supplying an answer to the request for information further comprises: providing the request for information to a user via an output device; and enabling the user to supply the answer to the request for information.

11. The method of claim 1 further comprising providing an indication that the activity has been performed.

12. The method of claim 1 wherein the automatically supplying an answer to the request for information to the IVR system further comprises transmitting, by the computing device, a dual-tone multi-frequency (DTMF) signal to the IVR system.

13. A non-transitory computer readable storage medium storing computer program instructions capable of being executed by a computer processor on a computing device, the computer program instructions defining the steps of:
- receiving, by the computer processor, a user request to connect to an Interactive Voice Response (IVR) system to perform an action, the computer processor independent of the IVR system;
- connecting, by the computer processor, to the IVR system;
- obtaining, by the computer processor from the IVR system, a request for information;
- automatically supplying, by the computer processor, an answer to the request for information to the IVR system in response to the request for information; and
- repeating, by the computer processor, the obtaining and supplying steps until the action has been performed.

14. The non-transitory computer readable storage medium of claim 13 further comprising storing, in a memory, decision trees of IVR systems.

15. The non-transitory computer readable storage computer readable medium of claim 14 wherein the computer program instructions defining the step of automatically supplying an answer to the request for information further comprises computer program instructions defining the step of retrieving a decision tree from the stored decision trees.

16. The non-transitory computer readable storage computer readable medium of claim 15 wherein the automatically supplying an answer to the request for information further comprises computer program instructions defining the step of using the decision tree to determine the answer to the request.

17. The non-transitory computer readable storage computer readable medium of claim 13 further comprising computer program instructions defining the step of training the computing device so that the computing device correctly performs the automatically supplying step.

18. The non-transitory computer readable storage computer readable medium of claim 17 wherein the computer program instructions defining the step of training the computing device further comprises computer program instructions defining the steps of:
- connecting to one IVR system in a plurality of IVR systems, each IVR system in the plurality comprising a decision tree;
- learning the decision tree for the one IVR system by traversing through every option in the decision tree; and
- repeating the connecting and learning steps for each IVR system in the plurality of IVR systems.

19. The non-transitory computer readable storage computer readable medium of claim 18 further comprising computer program instructions defining the step of storing each learned decision tree.

20. The non-transitory computer readable storage computer readable medium of claim 13 wherein the computer program instructions defining the step of automatically supplying an answer to the request for information further comprises computer program instructions defining the steps of:
- providing the request for information to a user via an output device; and
- enabling the user to supply the answer to the request for information.

21. The non-transitory computer readable storage computer readable medium of claim 13 wherein the computer program instructions defining the step of automatically supplying an answer to the request for information to the IVR system further comprises computer program instructions defining the step of transmitting a dual-tone multi-frequency (DTMF) signal to the IVR system.

* * * * *